US012522364B2

(12) United States Patent
Healy

(10) Patent No.: US 12,522,364 B2
(45) Date of Patent: Jan. 13, 2026

(54) PASSIVE HEAD AND NECK PROTECTION PULL HANDLE INITIATION

(71) Applicant: ROCKWELL COLLINS, INC., Cedar Rapids, IA (US)

(72) Inventor: Stephen C. Healy, Witchita, KS (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 65 days.

(21) Appl. No.: 18/454,372

(22) Filed: Aug. 23, 2023

(65) Prior Publication Data

US 2025/0066027 A1   Feb. 27, 2025

(51) Int. Cl.
*B64D 25/04* (2006.01)
*B64D 25/10* (2006.01)

(52) U.S. Cl.
CPC ............. *B64D 25/04* (2013.01); *B64D 25/10* (2013.01)

(58) Field of Classification Search
CPC ................................ B64D 25/04; B64D 25/10
See application file for complete search history.

(56) References Cited

U.S. PATENT DOCUMENTS

| | | | | |
|---|---|---|---|---|
| 2,569,638 A * | 10/1951 | Martin | ................... | B64D 25/10 244/122 AE |
| 2,998,213 A * | 8/1961 | Pitts | ....................... | B64D 25/10 244/141 |
| 3,329,464 A | 7/1967 | Barwood et al. | | |
| 3,525,490 A * | 8/1970 | Duncan | .................. | A47B 96/20 244/122 R |
| 4,813,634 A | 3/1989 | Zuck | | |
| 4,982,916 A * | 1/1991 | Dupont | ................... | B64D 25/10 244/122 AF |
| 7,699,265 B2 * | 4/2010 | Mastrolia | ............... | B64D 25/10 244/122 AG |
| 11,305,880 B2 * | 4/2022 | Holstine | .............. | B64D 11/062 |
| 11,427,339 B2 * | 8/2022 | Salois | ................ | B64D 11/0689 |
| 11,702,215 B2 | 7/2023 | Carson et al. | | |
| 11,935,432 B2 * | 3/2024 | Lake | ...................... | B64D 25/10 |
| 2020/0189757 A1 * | 6/2020 | Salois | .................... | B64C 1/1476 |

FOREIGN PATENT DOCUMENTS

GB   2619609   12/2023

OTHER PUBLICATIONS

United Kingdom Intellectual Property Office, United Kingdom Search Report dated Nov. 18, 2024 in Application No. 2410762.5.

* cited by examiner

*Primary Examiner* — Justin M Benedik
(74) *Attorney, Agent, or Firm* — SNELL & WILMER L.L.P.

(57) ABSTRACT

An ejection system is disclosed herein. The ejection system includes a seat having a seat bucket and a seat back, a passive head and neck protection device coupled to the seat back, and an ejection initiation system. The ejection initiation system includes a pull handle coupled to the seat bucket, a first connector having a first end coupled to the pull handle, an ejection sequence initiation device configured to initiate an ejection sequence, a passive head and neck protection mechanism configured to activate the passive head and neck protection device, and an ejection pull connector having a first end and a second end, the second end coupled to the ejection sequence initiation device and to the passive head and neck protection mechanism.

20 Claims, 7 Drawing Sheets

PASSIVE HEAD AND NECK PROTECTION PULL HANDLE INITIATION

GOVERNMENT LICENSE RIGHTS

This disclosure was made with government support under contract No. 18-D-0109. The government has certain rights in the disclosure.

FIELD

The present disclosure relates generally to ejection seats and, more particularly, to passive head and neck protection pull handle initiation.

BACKGROUND

Many aircraft employ ejection seats configured to rapidly eject pilots or other occupants from the aircraft in the event of malfunction. Ejection seats are typically located under or proximate a canopy enclosing a cockpit of the aircraft. Following initiation of an ejection sequence, the canopy must generally be removed from the path of the ejection seat. Removal of the canopy is typically accomplished via a canopy jettison system or a canopy fracture system. As the ejection seat exits the cockpit the pilot and ejection seat experience windblast from the fast moving air. Some ejection seats are equipped with a passive head and neck protection device that protected the pilot's head and neck during ejection and mitigate the risks due to windblast.

SUMMARY

An ejection system is disclosed herein. The ejection system includes a seat having a seat bucket and a seat back, a passive head and neck protection device coupled to the seat back, and an ejection initiation system. The ejection initiation system includes a pull handle coupled to the seat bucket, a first connector having a first end coupled to the pull handle, an ejection sequence initiation device configured to initiate an ejection sequence, a passive head and neck protection mechanism configured to activate the passive head and neck protection device, and an ejection pull connector having a first end and a second end, the second end coupled to the ejection sequence initiation device and to the passive head and neck protection mechanism.

In various embodiments, the pull handle is a center pull handle and the ejection initiation system further includes a bell crank coupled to the seat bucket, wherein the second end of the first connector is coupled to the bell crank and the first end of the ejection pull connector is connected to the bell crank. In various embodiments, the ejection sequence initiation device further includes a spring coupled to the ejection pull connector and configured to apply tension to the passive head and neck protection cable, wherein the passive head and neck protection mechanism passing through the spring.

In various embodiments, the ejection system further includes a modular connector coupled to the passive head and neck protection cable at a first end and to the passive head and neck device at a second end, the modular connector includes a connector body having a first end and a second end, the first end coupled to the passive head and neck protection mechanism, a passive head and neck protection fitting coupled to second end of the connector body, and a second cable coupled to the passive head and neck protection fitting at one end and to the passive head and neck protection device at a second end.

In various embodiments, the modular connector further includes a removal hole formed in a sidewall of the connector body and a cable end coupled to the second end of the passive head and neck protection mechanism, the cable end configured to secure the second end of the passive head and neck protection mechanism to the connector body, the cable end configured to pass through the removal hole to detach the passive head and neck protection mechanism from the modular connector.

In various embodiments, the seat back is removably coupled to the seat bucket and the modular connector is configured to disconnect the passive head and neck protection mechanism by passing the cable out through the removal hole. In various embodiments, the connector body and the passive head and neck protection fitting are coupled by complimentary threading. In various embodiments, the ejection initiation system further includes a slotted connector including a slot formed therein, wherein the ejection pull connector is coupled to the slotted connector and a fastener to secure the ejection pull connector to the slotted connector, the fastener extending through the slot, wherein the fastener is configured to slide within the slot in response to engaging the pull handle.

In various embodiments, the ejection initiation system is configured to activate both the ejection sequence initiation device and the passive head and neck protection device. In various embodiments, the ejection sequence initiation device is a thermal battery.

Also disclosed herein is an ejection seat. The ejection seat includes a seat bucket, a seat back coupled to the seat bucket, a passive head and neck protection device coupled to the seat back, a pull handle coupled to the seat bucket, a first connector having a first end coupled to the pull handle, an ejection sequence initiation device configured to initiate an ejection sequence, a passive head and neck protection mechanism configured to activate the passive head and neck protection device, and an ejection pull connector having a first end and a second end, the second end coupled to the ejection sequence initiation device and to the passive head and neck protection mechanism.

In various embodiments, the pull handle is a center pull handle and the ejection seat further includes a bell crank coupled to the seat bucket, wherein the second end of the first connector is coupled to the bell crank and the first end of the ejection pull connector is connected to the bell crank. In various embodiments, the ejection seat further includes a spring coupled to the ejection pull connector and configured to apply tension to the passive head and neck protection mechanism, wherein the passive head and neck protection mechanism passing through the spring.

In various embodiments, the ejection seat further includes a modular connector coupled to the passive head and neck protection mechanism at a first end and to the passive head and neck device at a second end, the modular connector includes a connector body having a first end and a second end, the first end coupled to the passive head and neck protection mechanism, a passive head and neck protection fitting coupled to second end of the connector body, and a second cable coupled to the passive head and neck protection fitting at one end and to the passive head and neck protection device at a second end.

In various embodiments, the modular connector further includes a removal hole formed in a sidewall of the connector body and a cable end coupled to the second end of the passive head and neck protection mechanism, the cable end configured to secure the second end of the passive head and neck protection mechanism to the connector body, the cable end configured to pass through the removal hole to detach the passive head and neck protection mechanism from the modular connector.

In various embodiments, the seat back is removably coupled to the seat bucket and the modular connector is configured to disconnect the passive head and neck protection mechanism by passing the passive head and neck mechanism out through the removal hole. In various embodiments, the connector body and the passive head and neck protection fitting are coupled by complimentary threading.

In various embodiments, the ejection seat further includes a slotted connector including a slot formed therein, wherein the ejection pull connector is coupled to the slotted connector and a fastener to secure the ejection pull connector to the slotted connector, the fastener extending through the slot, wherein the fastener is configured to slide within the slot in response to engaging the pull handle. In various embodiments, the ejection pull connector is configured to activate both the ejection sequence initiation device and the passive head and neck protection device.

Also disclosed herein is a method of initiating an ejection sequence. The method includes receiving an ejection sequence initiation signal, deploying a passive head and neck protection device in response to the ejection sequence initiation signal, and initiating the ejection sequence, after deploying the passive head and neck protection device, in response to the ejection sequence initiation signal.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
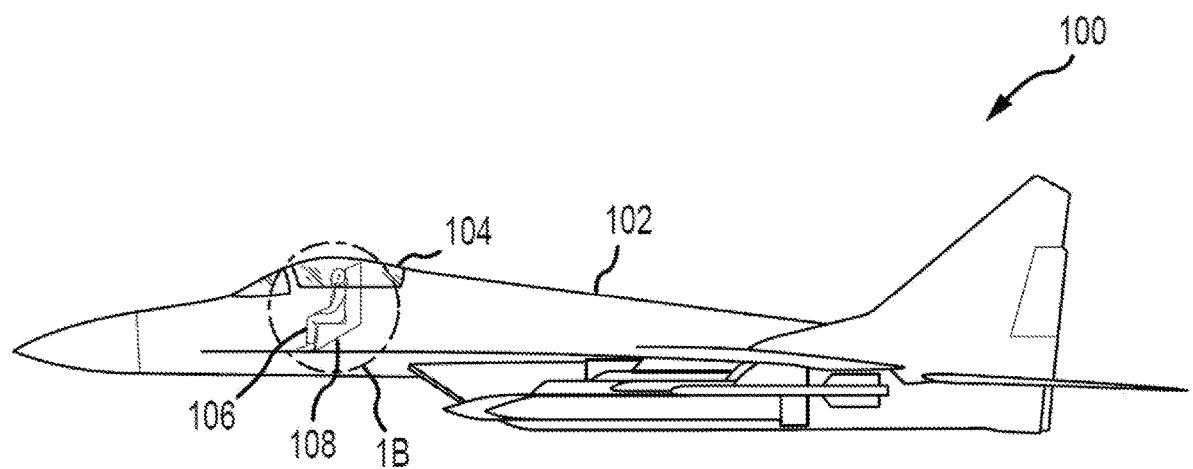
FIG. 1A illustrates a simplified side view of an aircraft having a canopy, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a passive head and neck protection pull handle initiation system. Passive head and neck protection (PHNP) devices currently in use on ejection seats use hot gasses initiated from the rocket catapult of the ejection seat. This delays the deployment of the PHNP until after the rocket catapult has been fired. This delay may tend to increase the risk of injury to the pilot. In various embodiments, the pilot may experience windblast without the PHNP being deployed. In various embodiment, the PHNP device may be prevented from deployment due to windblast forces on the PHNP device.

Disclosed herein is a mechanical mechanism that is configured to deploy the PHNP device earlier than is possible using the hot gasses from the rocket catapult. In various embodiments, the PHNP device may be deployed before starting the ejection sequence. In various embodiments, the earlier deployment of the PHNP device tends to reduce the probability of injury to the pilot during an ejection event. In various embodiments, the pull cable may be coupled to the ejection seat handle pull that is currently being used in aircraft. In various embodiments, the PHNP device may be deployed immediately in response to a pull on the ejection seat handle. As disclosed herein, and in various embodiments, the PHNP pull handle initiation system tends to reduce the risk of injury to the pilot. Furthermore, and in various embodiments, the PHNP pull handle initiation system tends to be a simple and low cost design.

Referring now to FIG. 1A, an aircraft 100 is illustrated. In various embodiments, aircraft 100 includes a fuselage 102 and a canopy 104 enclosing an internal cockpit in which an occupant 106 (e.g., a pilot) is positioned while operating aircraft 100. An ejection seat 108 is disposed within the cockpit and configured to accommodate occupant 106 during operation of aircraft 100 as well as during an ejection sequence occurring in the event of a malfunction of aircraft 100.

Figure 1B:
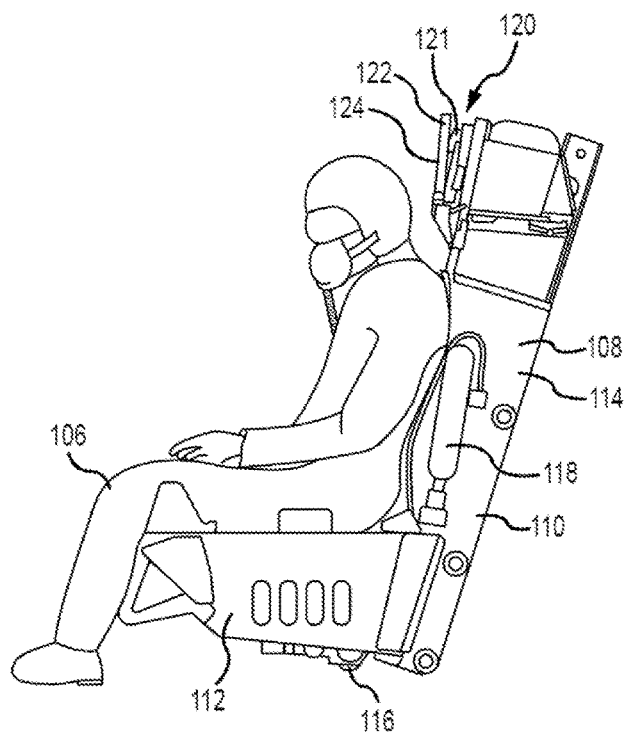
FIG. 1B illustrates an exploded side view of a crewmember and an upright ejection seat of the aircraft of FIG. 1A, in accordance with various embodiments.

Referring now to FIG. 1B, ejection seat 108 is illustrated with occupant 106 positioned thereon. In various embodiments, ejection seat 108 includes a seat frame 110 comprising a seat base 112 and a seat back 114 adapted to support occupant 106. Ejection seat 108 is equipped with a propulsion subsystem typically comprising a catapult and a rocket motor 116 for propelling seat frame 110 free of aircraft 100 in response to an eject signal. In various embodiments, ejection seat 108 is further equipped with a remote oxygen supply 118 and may include other features typically associated with ejection mechanisms.

In various embodiments, ejection seat 108 includes a passive head and neck restraint device 120 configured to deploy from a stowed position as shown in FIG. 1B to a deployed position to support the head of occupant 106 from above and behind in a tilted forward orientation. Supporting the head of occupant 106 from above and behind, reduces a tendency of the head to jerk upward and back due to the sudden wind blast upon exiting aircraft 100. In various embodiments, passive head and neck restraint device 120 comprises a pair of struts, including a left strut 122 (or first strut) and a right strut 124 that are pivotably attached to seat back 114 of seat frame 110. In various embodiments, passive head and neck restraint device 120 further includes a head panel 121 that is also pivotably attached to seat back 114 of seat frame 110. In various embodiments, head panel 121, together with left strut 122 and right strut 124, when deployed, provide a structure that prevents undesired movement of the head of occupant 106 during an ejection sequence.

Figure 2B:
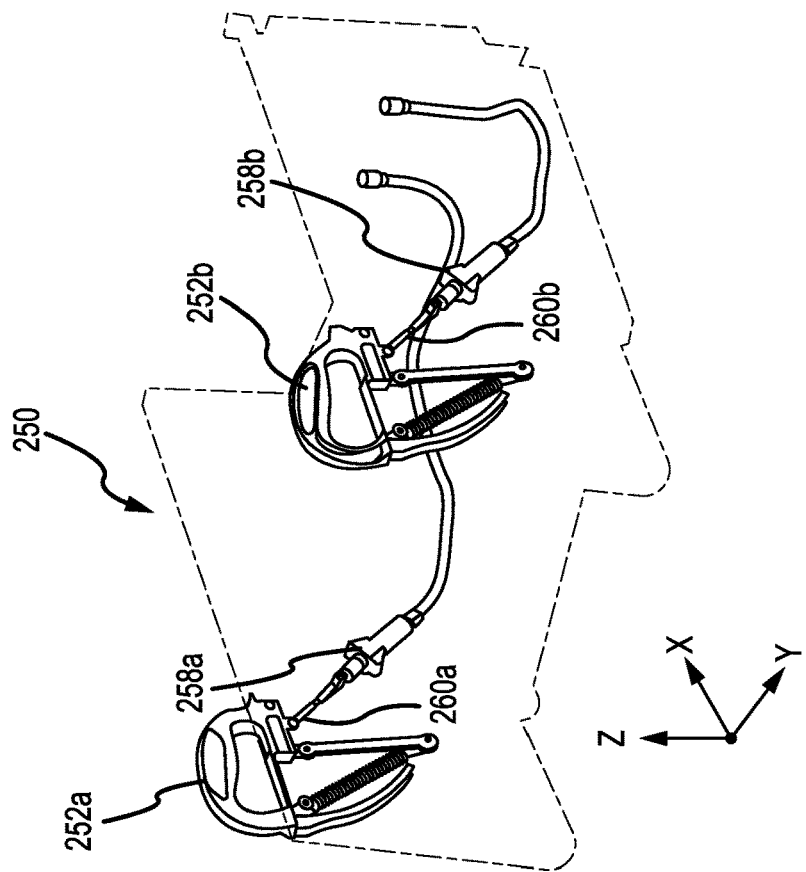
FIG. 2B illustrates side pull handles for use with an ejection seat, in accordance with various embodiments.
Figure 2A:
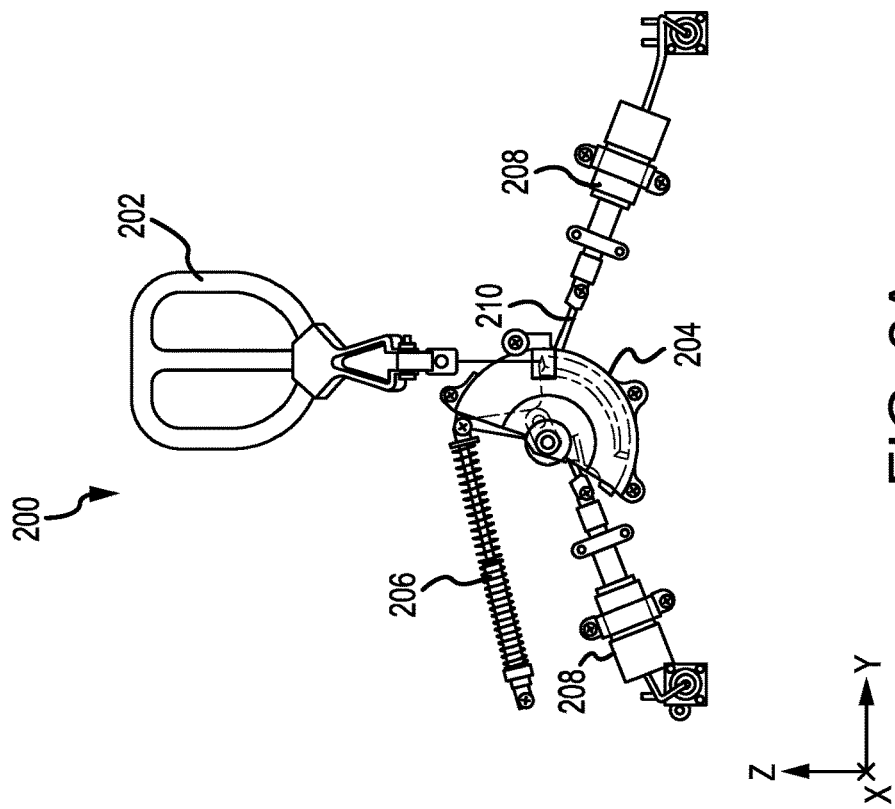
FIG. 2A illustrates a center pull handle for use with an ejection seat, in accordance with various embodiments.

Referring now to FIGS. 2A and 2B, pull handle systems for initiating an ejection seat are illustrated, in accordance with various embodiments. FIG. 2A illustrates a center pull handle system 200 including a pull handle 202, a bell crank 204, a system resistor 206, thermal batteries 208, and battery pull connectors 210. Pull handle 202, system resistor 206, and thermal batteries 208 are coupled to bell crank 204. Thermal batteries 208 are coupled to bell crank 204 by battery pull connector 210. Bell crank 204 rotates (e.g., in the counter-clockwise direction) in response to pull handle 202 being pulled (e.g., in the positive z-direction). The rotation of bell crank 204 pulls on battery pull connector 210 which initiate thermal batteries 208. Thermal batteries 208 provide an electric power source to initiate the ejection sequence in response pulling pull handle 202. System resistor 206 prevents bell crank 204 from unintentionally rotating.

FIG. 2B illustrates a side pull handle system 250 including a first pull handle 252a, a second pull handle 252b, a first mechanical initiator 258a, a second mechanical initiator 258b, a first initiator connector 260a, and a second initiator connector 260b. First mechanical initiator 258a is coupled to first pull handle 252a by first initiator connector 260a. Second mechanical initiator 258b is coupled to second pull handle 252b by second initiator connector 260b. First mechanical initiator 258a is initiated in response to pulling first pull handle 252a (e.g., in the positive z-direction and rotating clockwise). Second mechanical initiator 258b is initiated in response to pulling second pull handle 252b (e.g., in the positive z-direction and rotating clockwise). In various embodiments, a linkage connects first pull handle 252a to second pull handle 252b so that both first pull handle 252a and second pull handle 252b are activated in response to pulling either pull handle 252a, 252b.

Figure 3:
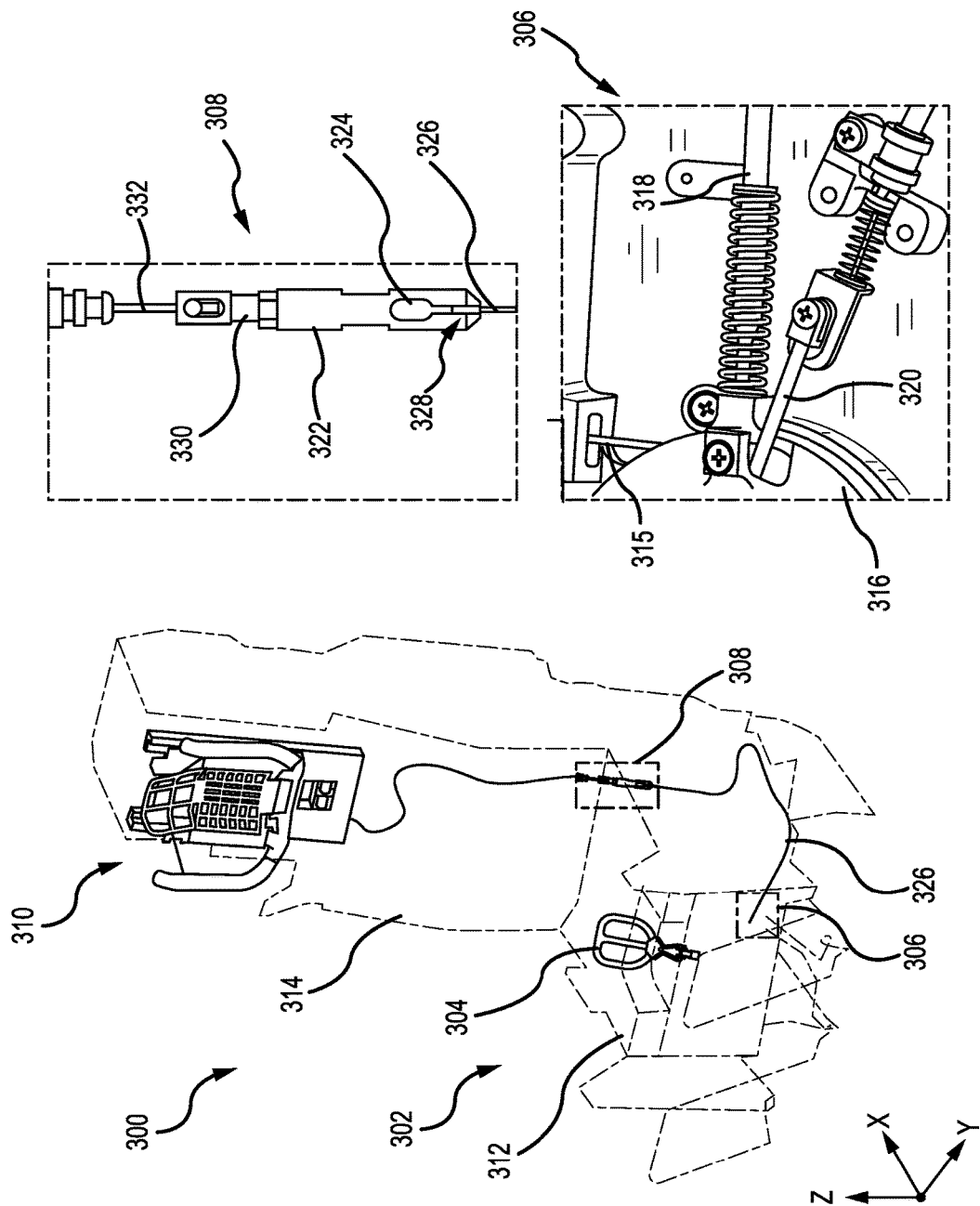
FIG. 3 illustrates an ejection system that deploys a passive head and neck protection device when the ejection sequence is initiated, in accordance with various embodiments.

Referring now to FIG. 3, a passive head and neck protection (PHNP) system 300 is illustrated, in accordance with various embodiments. PHNP system 300 includes an ejection seat 302, a center pull handle 304, an ejection initiation system 306, a modular connector 308, and a PHNP device 310. Ejection seat 302 includes a seat bucket 312 and a seat back 314. In various embodiments, seat back 314 may be removably coupled to seat bucket 312. That is, seat back 314 is configured to be removed from seat bucket 312. Center pull handle 304 is located near a front edge (e.g., in the negative x-direction) of seat bucket 312. Deployment of PHNP device 310 and the ejection sequence both initiated in response to pulling center pull handle 304. Center pull handle 304 activates ejection initiation system 306 which initiates both the ejection sequence initiator and a PHNP pull cable 326 to activate modular connector 308 which deploys PHNP device 310. In various embodiments, PHNP pull cable 326 may be a mechanical mechanism, referred to as a PHNP pull mechanism, that is configured to engage and activate modular connector 308. In various embodiments, PHNP pull cable 326 may be a mechanical linkage.

Ejection initiation system 306, as illustrated, is located underneath, or inside, seat bucket 312. Ejection initiation system 306 includes a bell crank 316 coupled to center pull handle 304 by cable 315, a system lock 318, and an ejection pull connector 320. Bell crank 316 rotates (e.g., in the counter-clockwise direction) in response to center pull handle 304. System lock 318 prevents bell crank 316 from rotating and may be used to lock the ejection system prior to performing maintenance. The rotation of bell crank 316 activates ejection pull connector 320 which activates both the ejection sequence initiator and PHNP device 310. PHNP device 310 is activated via modular connector 308.

Modular connector 308 is located inside, or behind (e.g., in the negative x-direction) seat back 314. Modular connector 308 includes a connector body 322, a removal hole 324 formed through connector body 322, a cable end 328, a PHNP fitting 330, and a second cable 332. Cable end 328 has a larger diameter than PHNP pull cable 326 and is coupled to an end of PHNP pull cable 326 adjacent connector body 322. In various embodiments, cable end 328 may be spherical, rectangular, or triangular, among other shapes. Cable end 328 is configured to secure PHNP pull cable 326 to connector body 322. PHNP pull cable 326 may be coupled to connector body 322 by passing cable end 328 through removal hole 324 and into connector body 322.

PHNP pull cable 326 may be removed from connector body by passing cable end 328 from connector body 322 through removal hole 324. This process may be used when seat back 314 is removed from seat bucket 312 and reattached to seat bucket 312.

Connector body 322 is generally cylindrical in shape and has an internal cavity that is configured to receive PHNP pull cable 326 and cable end 328. PHNP fitting 330 is configured to receive and secure second cable 332. Second cable 332 is coupled to PHNP device 310 which is configured to be initiated in response to second cable 332 being pulled (e.g., moving in the negative z-direction). PHNP fitting 330 is removably coupled to connector body 322. In various embodiments, PHNP fitting 330 and connector body 322 may include complimentary threading to adjust the tension in the connection between connector body 322 and PHNP fitting 330. In various embodiments, a ball lock, a detent, or a set screw, among other options, may be used to secure PHNP fitting 330 to connector body 322.

Figure 4A:
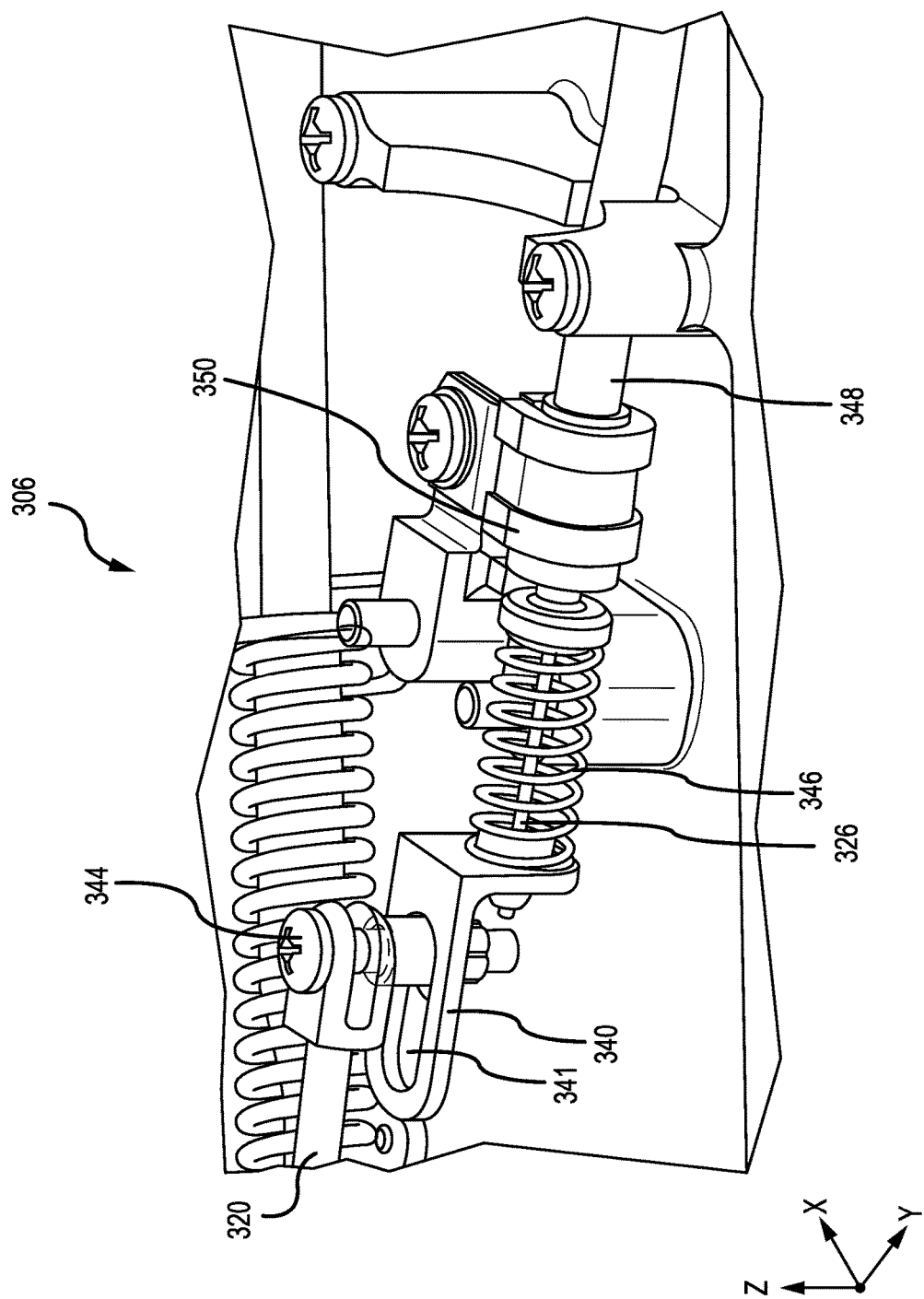
FIGS. 4A and 4B illustrate an ejection initiation system for use an ejection seat having a passive head and neck protection device, in accordance with various embodiments.
Figure 4B:
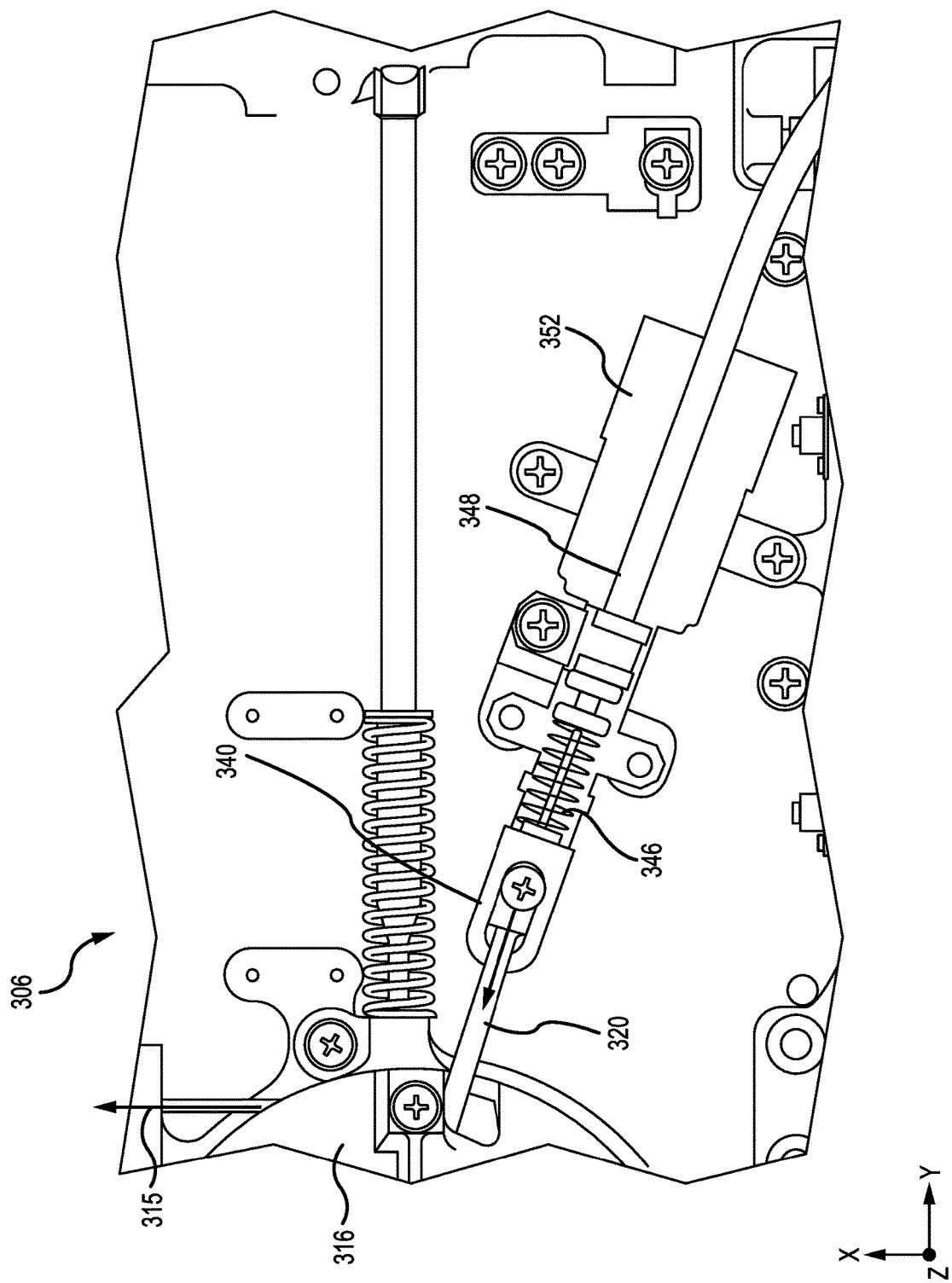

Referring now to FIGS. 4A and 4B, ejection initiation system 306 is illustrated in greater detail, in accordance with various embodiments. FIG. 4A illustrates a perspective side view of ejection initiation system 306. FIG. 4B illustrates a top view of ejection initiation system 306. As discussed above, ejection initiation system 306 includes cable 315, bell crank 316, and ejection pull connector 320. ejection initiation system 306 further includes a slotted connector 340, fastener 344, a spring 346, a PHNP pull cable 326, a cable sheath 348, a sheath anchor 350, and an ejection sequence initiation device 352. As discussed above, cable 315 is coupled to center pull handle 304 and to bell crank 316. Ejection pull connector 320 is coupled to bell crank 316 at a first end and is pulled (e.g., in the negative y-direction) in response to bell crank 316 rotating. Ejection sequence initiation device 352 is configured to provide a signal to an onboard processor that controls the ejection sequence. In various embodiments, ejection sequence initiation device 352 may be a thermal battery.

Ejection pull connector 320 includes holes, or apertures, configured to receive fastener 344 to couple ejection pull connector 320 to slotted connector 340. In various embodiments, ejection pull connector 320 may also be coupled to ejection sequence initiation device 352. In this configuration, both ejection sequence initiation device 352 and PHNP device 310 may be initiated in response to bell crank 316 rotating. Fastener 344 passes through ejection pull connector 320 and through a slot 341 in slotted connector 340. Slot 341 allows ejection pull connector 320 and fastener 344, to move slightly without initiating PHNP device 310. In various embodiments, this tends to increase the safety of the ejection by ensuring ejection sequence initiation device 352 is activated to initiate the ejection sequence regardless of whether PHNP device 310 is activated.

Spring 346 is coupled to slotted connector 340 at one end and to cable sheath 348 at the other end. PHNP pull cable 326 is coupled to slotted connector 340 and passes through spring 346 and cable sheath 348 to connect to modular connector 308. Spring 346 exerts a force away from slotted connector 340 (e.g., in the positive y-direction) in order to maintain tension on PHNP pull cable 326. Keeping PHNP pull cable 326 under tension reduces the amount of pull to initiate PHNP device 310 due to removing any slack from PHNP pull cable 326. Cable sheath 348 is secured to seat bucket 312 by sheath anchor 350.

Figure 5B:
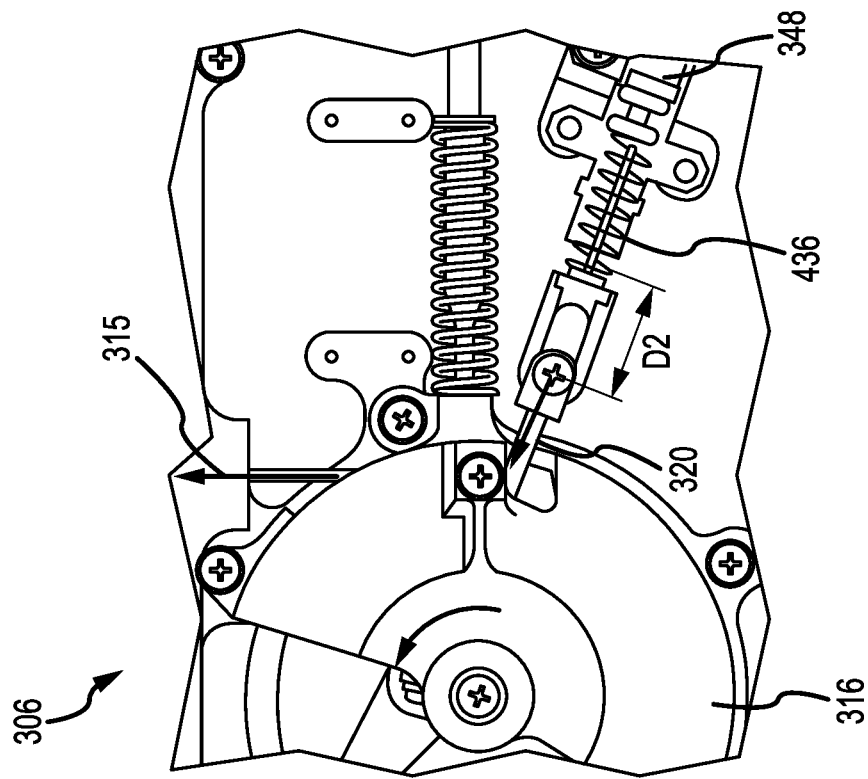
FIGS. 5A and 5B illustrate different positions of an ejection initiation system in response to pulling an ejection handle, in accordance with various embodiments.
Figure 5A:
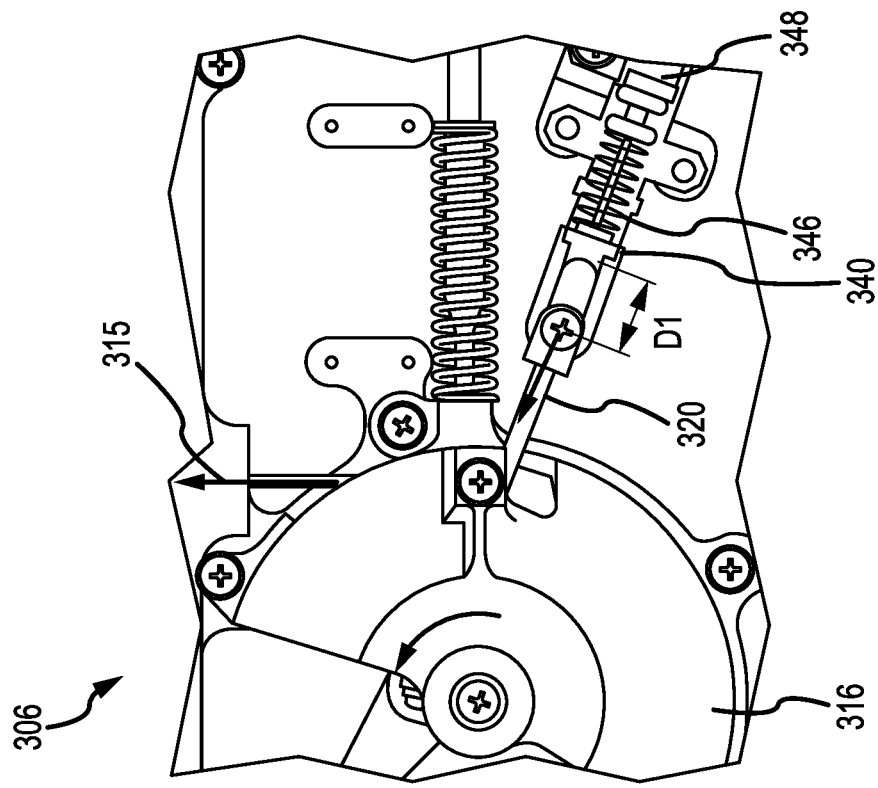

Referring now to FIGS. 5A and 5B, ejection initiation system 306 while initiating the ejection sequence illustrated, in accordance with various embodiments. FIG. 5A illustrates ejection initiation system 306 at a half pull position. FIG. 5B illustrates ejection initiation system 306 at a full pull position. The half pull position is the state in which center pull handle 304 is pulled enough to translate fastener 344 a first distance D1 within slot 341 of slotted connector 340. Distance D1 may be about 0.3 inches to about 0.6 inches, and more specifically, about 0.4 inches to about 0.5 inches. In various embodiments, slot 341 may be implemented as a safety feature in order to ensure that ejection sequence initiation device 352 is initiated at nearly the same time as PHNP device 310. In various embodiments, slot 341 may be different sizes or may be removed entirely.

The full pull position is the state in which center pull handle 304 is pulled enough to initiate the ejection sequence and PHNP device 310. Fastener 344 travels a second distance D2 (i.e., the full distance) including a length of slot 341 of slotted connector 340 and additional distance to full ejection handle pull. Distance D2 may be about 0.7 inches to about 1.0 inches, and more specifically, about 0.8 inches to about 0.9 inches.

Figure 6B:
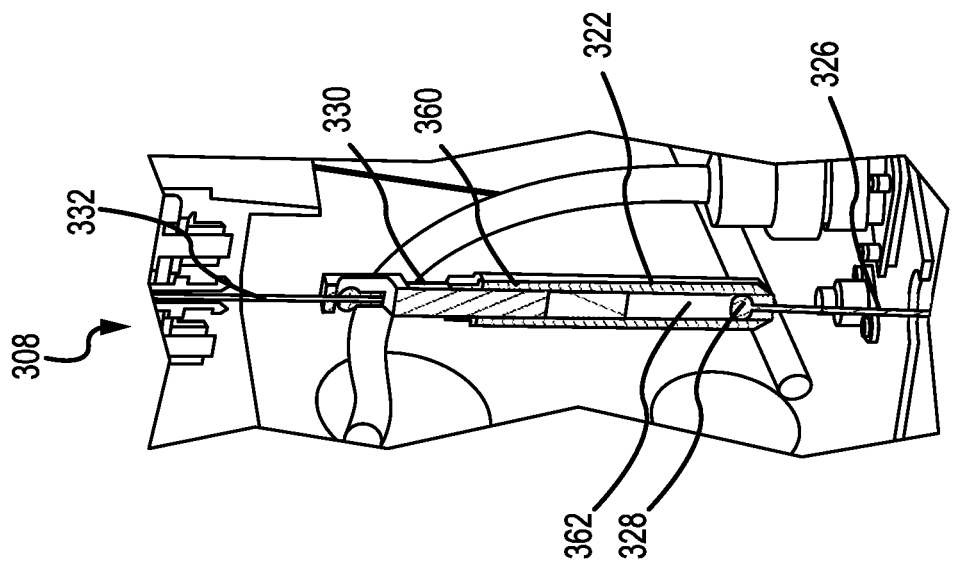
FIGS. 6A and 6B illustrate a modular connector for use with an ejection seat including a removable back and a passive head and neck protection device, in accordance with various embodiments.
Figure 6A:
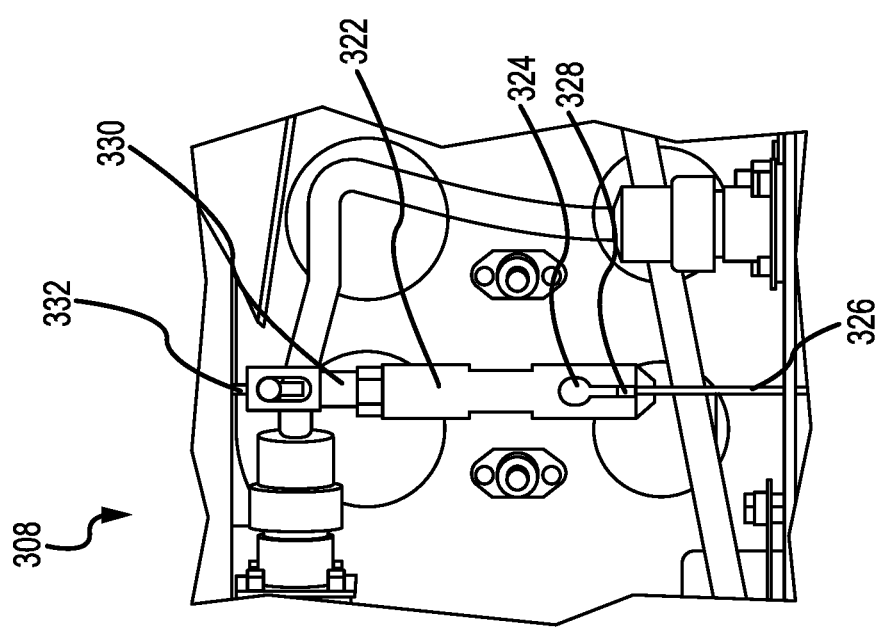

Referring now to FIGS. 6A and 6B, modular connector 308 is illustrated in greater detail, in accordance with various embodiments. FIG. 6A is a view of modular connector 308 coupled to seat back 314. FIG. 6B is a cross section view of modular connector 308. As seen in FIG. 6B, connector body 322 includes threading configured to receive PHNP fitting 330. Connector body 322 further includes a cavity 362 configured to receive and secure cable end 328.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An ejection system, comprising:
   a seat having a seat bucket and a seat back;
   a passive head and neck protection device coupled to the seat back; and
   an ejection initiation system, including:
      a pull handle coupled to the seat bucket;
      a first connector having a first end coupled to the pull handle;
      an ejection sequence initiation device configured to initiate an ejection sequence;
      a passive head and neck protection mechanism configured to activate the passive head and neck protection device; and
      an ejection pull connector having a first end and a second end, the second end coupled to the ejection sequence initiation device and to the passive head and neck protection mechanism.

2. The ejection system of claim 1, wherein the pull handle is a center pull handle, the ejection initiation system further comprising:
   a bell crank coupled to the seat bucket, wherein the second end of the first connector is coupled to the bell crank and the first end of the ejection pull connector is connected to the bell crank.

3. The ejection system of claim 1, wherein the ejection sequence initiation device further comprises:
   a spring coupled to the ejection pull connector and configured to apply tension to the passive head and neck protection cable, wherein the passive head and neck protection mechanism passing through the spring.

4. The ejection system of claim 1, further comprising:
   a modular connector coupled to the passive head and neck protection cable at a first end and to the passive head and neck device at a second end, the modular connector including:
      a connector body having a first end and a second end, the first end coupled to the passive head and neck protection mechanism;
      a passive head and neck protection fitting coupled to second end of the connector body; and
      a second cable coupled to the passive head and neck protection fitting at one end and to the passive head and neck protection device at a second end.

5. The ejection system of claim 4, wherein the modular connector further comprises:
   a removal hole formed in a sidewall of the connector body; and
   a cable end coupled to the second end of the passive head and neck protection mechanism, the cable end configured to secure the second end of the passive head and neck protection mechanism to the connector body, the cable end configured to pass through the removal hole to detach the passive head and neck protection mechanism from the modular connector.

6. The ejection system of claim 5, wherein the seat back is removably coupled to the seat bucket and the modular connector is configured to disconnect the passive head and neck protection mechanism by passing the cable out through the removal hole.

7. The ejection system of claim 4, wherein the connector body and the passive head and neck protection fitting are coupled by complimentary threading.

8. The ejection system of claim 1, wherein the ejection initiation system further comprises:
   a slotted connector including a slot formed therein, wherein the ejection pull connector is coupled to the slotted connector; and
   a fastener to secure the ejection pull connector to the slotted connector, the fastener extending through the slot, wherein the fastener is configured to slide within the slot in response to engaging the pull handle.

9. The ejection system of claim 1, wherein the ejection initiation system is configured to activate both the ejection sequence initiation device and the passive head and neck protection device.

10. The ejection system of claim 1, wherein the ejection sequence initiation device is a thermal battery.

11. An ejection seat, comprising:
    a seat bucket;
    a seat back coupled to the seat bucket;
    a passive head and neck protection device coupled to the seat back;
    a pull handle coupled to the seat bucket;
    a first connector having a first end coupled to the pull handle;
    an ejection sequence initiation device configured to initiate an ejection sequence;
    a passive head and neck protection mechanism configured to activate the passive head and neck protection device; and
    an ejection pull connector having a first end and a second end, the second end coupled to the ejection sequence initiation device and to the passive head and neck protection mechanism.

12. The ejection seat of claim 11, wherein the pull handle is a center pull handle, the ejection seat further comprising:
    a bell crank coupled to the seat bucket, wherein the second end of the first connector is coupled to the bell crank and the first end of the ejection pull connector is connected to the bell crank.

13. The ejection seat of claim 11, further comprising:
a spring coupled to the ejection pull connector and configured to apply tension to the passive head and neck protection mechanism, wherein the passive head and neck protection mechanism passing through the spring.

14. The ejection seat of claim 11, further comprising:
a modular connector coupled to the passive head and neck protection mechanism at a first end and to the passive head and neck device at a second end, the modular connector including:
  a connector body having a first end and a second end, the first end coupled to the passive head and neck protection mechanism;
  a passive head and neck protection fitting coupled to second end of the connector body; and
  a second cable coupled to the passive head and neck protection fitting at one end and to the passive head and neck protection device at a second end.

15. The ejection seat of claim 14, wherein the modular connector further comprises:
  a removal hole formed in a sidewall of the connector body; and
  a cable end coupled to the second end of the passive head and neck protection mechanism, the cable end configured to secure the second end of the passive head and neck protection mechanism to the connector body, the cable end configured to pass through the removal hole to detach the passive head and neck protection mechanism from the modular connector.

16. The ejection seat of claim 15, wherein the seat back is removably coupled to the seat bucket and the modular connector is configured to disconnect the passive head and neck protection mechanism by passing the passive head and neck mechanism out through the removal hole.

17. The ejection seat of claim 14, wherein the connector body and the passive head and neck protection fitting are coupled by complimentary threading.

18. The ejection seat of claim 11, further comprising:
  a slotted connector including a slot formed therein, wherein the ejection pull connector is coupled to the slotted connector; and
  a fastener to secure the ejection pull connector to the slotted connector, the fastener extending through the slot, wherein the fastener is configured to slide within the slot in response to engaging the pull handle.

19. The ejection seat of claim 11, wherein the ejection pull connector is configured to activate both the ejection sequence initiation device and the passive head and neck protection device.

20. A method of initiating an ejection sequence, comprising:
  receiving, via a passive head and neck protection mechanism and an ejection sequence initiation device, an ejection sequence initiation signal in response to a pull handle coupled to a seat bucket being pulled, the seat bucket coupled to a seat back and the seat back coupled to a passive head and neck protection device, wherein the pull handle is further coupled to an ejection pull connector that is pulled in response to the pull handle being pulled and initiates the ejection sequence initiation signal;
  deploying, via the passive head and neck protection mechanism, a passive head and neck protection device in response to the ejection sequence initiation signal; and
  initiating, via the ejection sequence initiation device, the ejection sequence, after deploying the passive head and neck protection device, in response to the ejection sequence initiation signal.

* * * * *